United States Patent Office 3,600,375
Patented Aug. 17, 1971

3,600,375
AZOMETHANODIOXOCINS
Chun-Shan Wang, Midland, and Henry E. Hennis, Coleman, Mich., asssignors to The Dow Chemical Company, Midland, Mich.
No Drawing. Filed Mar. 25, 1968, Ser. No. 715,488
Int. Cl. A61l 13/00; C07c 107/00; C09b 29/00
U.S. Cl. 260—152
13 Claims

ABSTRACT OF THE DISCLOSURE

Azomethanodioxocins having the formula

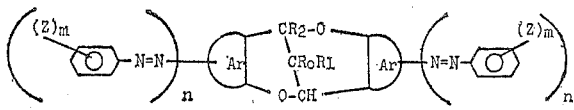

where Ar is a homocyclic or heterocyclic substituted or unsubstituted aromatic ring; $m$ and $n$ are integers of from 0 to 2 inclusive; $R_0$ is H; $R_1$ is H, aryl or alkyl; $R_0$ and $R_1$ may together with the C to which they are attached form the cyclohexane ring; $R_2$ is H, aryl or alkyl and Z is hydroxy or a dialkylamino group, are produced by a process comprising reacting by contacting the appropriate diazonium salt with the appropriate phenol or N,N-dialkylaniline. The new azomethanodioxocins have bacteriocidal activity and are excellent dyes and pH indicators.

SUMMARY OF THE INVENTION

It has now been found that new azomethanodioxocins are produced from the reaction of the corresponding diazonium salts with an appropriate phenol or N,N-dialkylaniline. This reaction is the standard, well-known diazonium salt coupling reaction. The azomethanodioxocins produced by this process are those having the formula

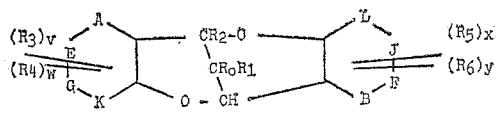

where each of $v$, $w$, $x$ and $y$ independently is a number from 0 to 4; each of A, B, E, F, G, J, K and L independently is N or CH provided that neither A and E, E and G, G and K, B and F, F and J or J and L can simultaneously be N; $R_0$ is H; $R_1$ is H, aryl having up to ten carbon atoms or alkyl having up to eighteen carbon atoms; $R_0$ and $R_1$ may together with the C to which they are attached form the cyclohexane ring; $R_2$ is H, aryl having up to ten carbon atoms or alkyl having up to eighteen carbon atoms; each of $R_3$, $R_4$, $R_5$ and $R_6$, being absent when the corresponding subscript $v$, $w$, $x$ or $y$ is 0, when present is independently aryl having up to ten carbon atoms, alkyl having up to eighteen carbon atoms, a hydroxyarylazo, a N,N-dialkylaminoarylazo, halogen or OM where M is a hydrocarbon radical having up to eighteen carbon atoms provided that at least one of $R_3$, $R_4$, $R_5$ and $R_6$ is a hydroxyarylazo or a N,N-dialkylaminoarylazo and is attached to a carbon atom in the E, F, K or L positions; and $R_3$ combined with $R_4$, as well as $R_5$ combined with $R_6$, together with the atoms to which they are attached, may form the pyridine, pyrimidine, quinoline, benzene, naphthalene, anthracene, phenanthrene or pyran ring.

A specific new azomethanodioxocin is 4-((6H,12H-6,12-methanodibenzo[b,f][1,5]dioxocin - 2 - yl - )azo-)phenol or a shorter term 4-((MDBD-2-yl-)azo-)phenol

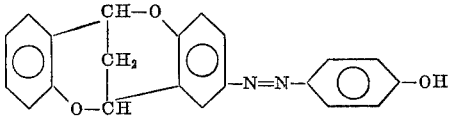

which is produced from the reaction of MDBD-2-diazonium chloride and phenol.

In order to produce these new azomethanodioxocins, a diazonium salt corresponding to the azomethanodioxocin desired is reacted by contacting with an appropriate aryl coupling agent, i.e. a phenol or N,N-dialkylaniline. As is well known in the art, this diazonium salt coupling reaction is preferably conducted under weakly alkaline conditions for phenols, and weakly acidic conditions for N,N-dialkylanilines. After reaction, the azomethanodioxocin produced is collected by filtration. It may be water-washed and recrystallized from a solvent, e.g. alcohol, to yield the purified azomethanodioxocin.

The diazonium salt starting materials are prepared from the reaction of the aminodioxocin and nitrous acid. The aminodioxocins are prepared by the catalytic reduction of their corresponding nitrodioxocins as is more fully set forth in the application by one of us, Hennis, entitled "Aminodioxocins and a Process for Making Them," Ser. No. 715,490, filed concurrently herewith; the disclosure of which is hereby incorporated by reference. Since nitrous acid is unstable, it is generated in the presence of the aminodioxocin that is to be diazotized. The amine is dissolved in an aqueous solution of a mineral acid, usually hydrochloric or sulfuric. This mixture is cooled to a temperature between 0 and 15° C., and aqueous sodium nitrate is slowly added. If desired, a small amount of urea can then be added to eliminate any excess nitrous acid that may be formed. The resulting solution is a diazonium salt solution.

The phenols and N,N-dialkylanilines that are useful in this invention are those that have active hydrogens ortho or para, preferably para, to the electron donating hydroxy or amino group. These starting materials, of course, are the hydroxyaryl and N,N-dialkylamino portions of the hydroxyarylazo and N,N-dialkylaminoazo substituents named in the general azomethanodioxocin formula above. Suitable phenol starting materials for azomethanodioxocin production include phenol; the halophenols, e.g. o-chlorophenol, p-bromophenol; the alkylphenols, e.g. m-cresol, o-butylphenol, o-octadecylphenol; the polyhydroxybenzenes, e.g. catechol, resorcinol; the hydroxybenzoic acids, e.g. m-hydroxybenzoic acid, o-hydroxybenzoic acid; the alkoxyphenols, e.g. o-methoxyphenol, p-octadecoxyphenol; the nitrophenols, e.g. o-nitrophenol, m-nitrophenol; and the hydroxybenzaldehydes, e.g. m-hydroxybenzaldehyde, salicylaldehyde. Of course, the alkyl, hydroxy, alkoxy, carboxyl, nitro, formyl and halogen substituents can be used in combinations so long as a position ortho or para to the electron-donating group remains "open." Similarly, naphthols, e.g. β-naphthol, and anthrols, e.g. anthrol, are useful phenolic starting materials. Of course, these polycyclic phenols can contain the same substituents as shown above, so long as an ortho or para position is open. The N,N-dialkylanilines useful as starting materials are those in which each alkyl Independently contains up to eighteen carbon atoms. The aromatic ring can also contain the alkyl, alkoxy, hydroxy, carboxyl, nitro, formyl or halogen substituents, independently or in conjunction, so long as the active hydrogen remains ortho or para, preferably para, to the electron-donating group. Typical N,N-dialkylanilines suitable as starting materials include N,N-dimethylaniline,
N,N-dibutylaniline,
N,N-diisohexylaniline,
N,N-didecylaniline,
N,N-dihexadecylaniline,
N,N-dioctadecylaniline,
N,N-diethyl-o-toluidine,
N,N-dipropyl-o-chloroaniline,
N,N-dimethyl-o-methoxyaniline,
o-N,N-dipentylaminobenzoic acid,
o-N,N-dimethylaminobenzaldehyde and
N,N-diethyl-m-nitroaniline.

These new azomethanodioxocins have utility as dyes. For example, the dye can be applied to a fabric as a disperse type dye or the fabric can be placed in the coupling reaction mixture, a technique used in making printed fabrics. These compounds can also be used as bacteriocides and pH indicators.

DESCRIPTION OF SPECIFIC EMBODIMENT

In each of the following examples, the diazonium salt was MDBD-2-diazonium chloride. The procedure for its preparation was as follows: 2-amino-MDBD (0.14 g., 0.0006 mole) was dissolved in 10 ml. of 15% hydrochloric acid solution. Under ice cooling with stirring, 0.07 g. (0.001 mole) of sodium nitrite in 2 ml. of water was added dropwise to the amine hydrochloride solution. A positive test of nitrous acid was obtained by placing a drop of the solution on starch-iodide paper. The reaction mixture was kept at 15° C. for 30 minutes and used in the following examples.

EXAMPLE 1

1-((MDBD-2-yl-)azo-)-2-naphthol

MDBD-2-diazonium chloride (0.2 g.) was added to a solution of 0.2 g. of β-naphthol in 5 ml. of 10% sodium hydroxide solution. An orange-red precipitate appeared at once upon the mixing of these two solutions. The precipitate was filtered, washed with water and recrystallized twice from acetone. The yield of red needles, M.P. 260–261° C., was quantitative.

Calculated for $C_{25}H_{18}N_2O_3$ (percent): C, 76.14; H, 4.57; N, 7.11. Found (percent): C, 76.5; H, 4.70; N, 6.82.

EXAMPLE 2

4-chloro-6-((MDBD-2-yl-)azo-)phenol

The same procedure and amount of reactants were used as in Example 1 except that p-chlorophenol was used in place of β-naphthol. The yield of yellow-brown crystals, M.P. 182–184° C., was quantitative.

Calculated for $C_{21}H_{15}N_2ClO_3$ (percent): C, 66.57; H, 3.96; N, 7.40. Found (percent): C, 67.1; H, 4.05; N, 7.2.

EXAMPLE 3

2,4-dichloro-6-((MDBD-2-yl-)azo-)phenol

The same procedure and amount of reactants were used as in Example 1 except that 2,4-dichlorophenol was used in place of β-naphthol. The yield of brown crystals, M.P. 240–242° C., was quantitative.

Calculated for $C_{21}H_{14}N_2Cl_2O_3$ (percent): C, 61.02; H, 3.39; N, 6.78. Found (percent): C, 61.3; H, 3.33; N, 6.31.

EXAMPLE 4

2,6-dichloro-4-((MDBD-2-yl-)azo-)phenol

The same procedure and amount of reactants were used as in Example 1 except that 2,6-dichlorophenol was used in place of β-naphthol. The yield of yellow crystals, M.P. 208–209° C., was quantitative.

Calculated for $C_{21}H_{14}N_2Cl_2O_3$ (percent): C, 61.02; H, 3.39; N, 6.78. Found (percent): C, 61.3; H, 3.40; N, 6.31.

This compound is a bacteriocide. It was dissolved in isopropanol and diluted to 500 parts per million in warm melted agar. After solidification of the agar, a droplet containing Bacillus subtilis was deposited on the surface and after incubation there was observed 100% kill of Bacillus subtilis.

EXAMPLE 5

2-formyl-4-((MDBD-2-yl-)azo-)phenol

The same procedure and amount of reactants were used as in Example 1 except that o-hydroxybenzaldehyde was used in place of β-naphthol. The yield of orange crystals, M.P. 200–205° C., was quantitative.

Calculated for $C_{22}H_{16}N_2O_4$ (percent): C, 70.97; H, 4.30. Found (percent): C, 71.4; H, 4.50.

EXAMPLE 6

2,4,5-trichloro-6-((MDBD-2-yl-)azo-)phenol

The same procedure and amount of reactants were used as in Example 1 except that 2,4,5-trichlorophenol was used in place of β-naphthol. The yield of red crystals, M.P. 230–235° C., was quantitative.

Some other new azodioxocins which are produced from their corresponding diazonium salts and the appropriate phenol or N,N-dialkylaniline derivative by the coupling reaction are:

4-((MDBD-4-yl-)azo-)phenol from MDBD-4-diazonium chloride and phenol;

2-chloro-4-((MDBD-8-yl-)azo-)phenol from MDBD-2-diazonium bromide and o-chlorophenol;

4-bromo-2-((MDBD-10-yl-)azo-)phenol from MDBD-4-diazonium chloride and p-bromophenol;

4,4'-((MDBD-2,4-diyl-)bisazo-)dicresol from MDBD-2,4-bis-diazonium bromide and cresol;

2,2'-dibutyl-4,4'-((MDBD-2,8-diyl-)bisazo-)diphenol from MDBD-2,8-bis-diazonium chloride and o-butyl phenol;

2,2'-dioctadecyl-4,4'-((MDBD-4,10-diyl-)bisazo-)diphenol from MDBD-4,10-bis-diazonium bromide and o-octadecyl phenol;

2,2',2'',2'''-tetrahydroxy-5,5',5'',5'''-((MDBD-2,4,8,10-tetrayl-)tetrazo-)tetraphenol from MDBD-2,4,8,10-tetrazonium chloride and catechol;

3-hydroxy-6-((13-methyl-MDBD-4-yl-)azo-)phenol from 13-methyl-MDBD-4-diazonium bromide and resorcinol;

3-carboxyl-4-((6-ethyl-13-methyl-MDBD-8-yl-)azo-)phenol from 6-ethyl-13-methyl-MDBD-8-diazonium bromide and m-hydroxybenzoic acid;

2-nitro-4-((2-methyl-MDBD-10-yl-)azo-)phenol from 2-methyl-MDBD-10-diazonium chloride and o-nitrophenol;

3-formyl-4-((8,15-dimethyl-MBDBD-6-yl-)azo-)phenol from 8,15-dimethyl-MBDBD-6-diazonium bromide and m-hydroxybenzaldehyde;

4-bromo-2-((2-bromo-MDBD-10-yl-)azo-)phenol from 2-bromo-MDBD-10-diazonium chloride and p-bromophenol;

3-iodo-((6,11-dimethyl-7H,13H-7,13-methano(1,5)-benzodioxocin(3,4-c)-quinoline-9-yl-)azo-)phenol from 6,11-dimethyl-7H,13H-7,13-methano(1,5)benzodioxocin(3,4-c)-quinoline-9-diazonium bromide and m-iodophenol;

2-methyl-4-((6-ethyl-13-methyl-6H,12H-6,12-methano(1,5)-benzodioxocino(3,4-b)-pyridine-8-yl-)azo-)phenol from 6-ethyl-13-methyl-6H,12H-6,12-methano(1,5)-benzodioxocino(3,4-b)-pyridine-8-diazonium chloride and o-methyl phenol;

2-methoxy-4-((2-methoxy-MDBD-4-yl-)azo-)phenol from 2-methoxy-MDBD-4-diazonium bromide and 2-methoxy phenol; and 2-pentoxy-4-((1-hydroxy-MDBD-2-yl-)azo-)phenol from 1-hydroxy-MDBD-2-diazonium chloride and 2-pentoxy phenol;

N,N-dimethyl-4-((MDBD-4-yl-)azo-)aniline from MDBD-4-diazonium chloride and N,N-dimethyl aniline;

N,N-diethyl - 2 - chloro-4-((MDBD-8-yl-)azo-)aniline from MDBD - 2 - diazonium bromide and N,N-diethyl aniline;
N,N-di-n-butyl - 4 - bromo - 2 - ((MDBD-10-yl-)azo-)aniline from MDBD-10-diazonium chloride and N,N-di-n-butyl aniline.

N,N-di-n-decyl - 4,4' - ((MDBD - 2,4-diyl-) bisazo-)dianiline from MDBD - 2,4-bis-diazonium bromide and N,N-di-n-decyl aniline;
N,N-di-n-hexadecyl - 2,2' - dibutyl - 4,4' - ((MDBD - 2,8-diyl-)bisazo-)dianiline from MDBD - 2,8 - bis-diazonium chloride and N,N-di-n-hexadecyl aniline; and N,N-di-n-octadecyl-2,2'-dioctadecyl - 4,4' - ((MDBD-4,10-diyl-)bisazo-)dianiline from MDBD-4,10-bis-diazonium chloride and N,N-di-n-octadecyl aniline.

Similarly, the azodioxocins given in Table I below are made from their corresponding diazonium salts and appropriate phenol or N,N-dialkylaniline derivatives.

TABLE I

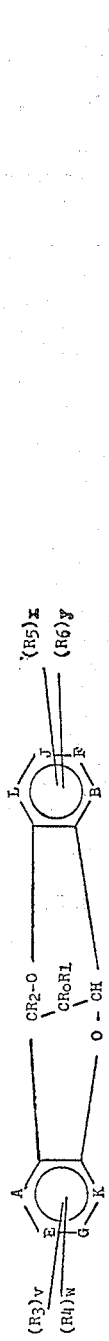

| R1 | R2 | R3 | R4 | R5 | R6 | R3+R4 | R5+R6 | A | B | E | F | G | J | K | L |
|---|---|---|---|---|---|---|---|---|---|---|---|---|---|---|---|
| C3H7 | C16H33 | --- | N2C6H4OH | --- | --- | | | CH | CH | C | C | CH | C | CH | CH |
| C4H13 | Naphthyl | Phenoxy | --- | N2C6H4(Cl)OH | --- | | | C | CH | CH | CH | CH | O | O | O |
| C14H33 | C3H7 | OC18H37 | N2C6H3(CH3)OH | --- | CH3 | | | CH | CH | C | C | CH | C | O | OH |
| Phenyl | CH3 | C4H9 | --- | N2C6H3(OH)2 | N2C6H3(OH)2 | | | CH | CH | C | CH | CH | N | O | O |
| CH3 | C4H9 | --- | --- | N2C6H3(COOH)OH | --- | | | O | C | C | C | N | CH | CH | CH |
| C4H9 | Phenyl | --- | N2C6H3(CHO)OH | --- | --- | | | CH | CH | C | C | CH | CH | O | CH |
| C16H31 | C4H9 | --- | --- | Naphthoxy | N2C6H3(OCH3)OH | | | O | C | C | C | N | CH | CH | N |
| C3H37 | C18H37 | C18H37 | --- | N2C6H4N(CH3)2 | --- | | | CH | O | C | O | O | C | CH | CH |
| C18H37 | C6H13 | N2C6H4N(C10H21)2 | --- | C4H9 | --- | | | CH | CH | CH | CH | CH | N | O | O |
| C4H9 | C4H9 | --- | --- | N2C6H4N(C4H9)2 | --- | | | CH | O | O | O | O | O | CH | CH |
| Naphthyl | C6H13 | CH3 | N2C6H4N(C18H37)2 | OC16H33 | --- | | | N | CH | C | O | O | CH | CH | CH |

We claim:
1. An azodioxocin compound having the formula

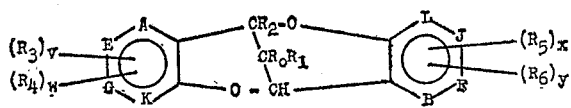

where each of $v$, $w$, $x$ and $y$ independently is a number from 0 to 4; each of A, B, E, F, G, J, K and L independently is N or CH provided that neither A and E, E and G, G and K, B and F, F and J or J and L can simultaneously be N; $R_0$ is H; $R_1$ is H, phenyl, naphthyl or alkyl having up to eighteen carbon atoms; $R_0$ and $R_1$ may together with the C to which they are attached form the cyclohexane ring; $R_2$ is H, phenyl, naphthyl or alkyl having up to eighteen carbon atoms; each of $R_3$, $R_4$, $R_5$ and $R_6$, being absent when the corresponding subscript $v$, $w$, $x$ or $y$ is 0, when present is independently phenyl, naphthyl, alkyl having up to eighteen carbon atoms, hydroxyphenylazo, hydroxynaphthylazo, N,N-dialkylaminophenylazo of up to 18 carbon atoms in each alkyl group, N,N-dialkylaminonaphthylazo of up to 18 carbon atoms in each alkyl group, halogen or OM where M is phenyl, naphthyl or alkyl having up to eighteen carbon atoms provided that at least one of $R_3$, $R_4$, $R_5$ and $R_6$ is hydroxyphenylazo, hydroxynaphthylazo, N,N-dialkylaminophenylazo or N,N-dialkylaminonaphthylazo and is attached to a carbon atom in the E, F, K or L position; and $R_3$ combined with $R_4$, as well as $R_5$ combined with $R_6$, together with the atoms to which they are attached, may form the pyridine, quinoline, benzene, naphthalene, anthracene or phenanthrene ring.

2. A compound as defined in claim 1 wherein only one of A, B, E and F and only one of B, F, J and L may be N.
3. A compound as defined in claim 1 wherein $R_3$, $R_4$, $R_5$ and $R_6$ are in the E, K, L and F positions.
4. A compound as defined in claim 1 wherein $R_3$ and $R_5$ are in the E and F positions and $R_4$ and $R_6$ are H.
5. A compound as defined in claim 1 wherein $R_1$ is H or alkyl having up to eighteen carbon atoms.
6. A compound as defined in claim 1 wherein $R_0$ and $R_1$ are H.
7. A compound as defined in claim 1 wherein $R_2$ is H or alkyl having up to eighteen carbon atoms.
8. 1-((6H,12H-6,12-methanodibenzo[b,f][1,5] - dioxocin-2-yl-)azo-)-2-napthol.
9. 4 - chloro - 6 - ((6H,12H-6,12-methanodibenzo[b,f][1,5]-dioxocin-2-yl-)azo-)phenol.
10. 2,4 - dichloro - 6 - ((6H,12H-6,12-methanodibenzo[b,f][1,5]-dioxocin-2-yl-)azo-)phenol.
11. 2,6-dichloro-4 - ((6H,12H - 6,12 - methanodibenzo[b,f][1,5]-dioxocin-2-yl-)azo-)phenol.
12. 2-formyl-4-((6H,12H - 6,12 - methanodibenzo[b,f][1,5]-dioxocin-2-yl-)azo-)phenol.
13. 2,4,5-trichloro-6-((6H,12H-6,12 - methanodibenzo[b,f][1,5]-dioxocin-2-yl-)azo-)phenol.

References Cited
UNITED STATES PATENTS

| | | | |
|---|---|---|---|
| 2,379,684 | 7/1945 | Conn et al. | 260—152 |
| 2,379,725 | 7/1945 | Lecher et al. | 260—152 |
| 2,387,848 | 10/1945 | Lecher et al. | 260—152 |
| 2,468,277 | 4/1949 | Strouse | 260—152 |
| 2,468,457 | 4/1949 | Orem et al. | 260—152 |
| 2,890,225 | 6/1959 | Gregory | 260—152X |
| 2,893,986 | 7/1959 | Long et al. | 260—152 |
| 2,894,003 | 7/1959 | Long et al. | 260—152X |
| 3,127,390 | 3/1964 | Mueller et al. | 260—152 |
| 3,376,280 | 4/1968 | Gottschlich et al. | 260—152 |

FLOYD D. HIGEL, Primary Examiner

U.S. Cl. X.R.

8—41R, 71; 252—408; 260—141, 152, 154, 155, 156, 338, 999; 424—226